United States Patent [19]

Lew

[11] Patent Number: 5,022,257

[45] Date of Patent: Jun. 11, 1991

[54] IMPULSE SENSOR WITH AMPLITUDE CALIBRATION MEANS

[76] Inventor: Hyok S. Lew, 7890 Oak St., Arvada, Colo. 80005

[21] Appl. No.: 497,903

[22] Filed: Mar. 23, 1990

Related U.S. Application Data

[63] Continuation-in-part of Ser. No. 296,662, Jan. 13, 1989, Pat. No. 4,910,994.

[51] Int. Cl.$^5$ .............................................. G01F 25/00
[52] U.S. Cl. ........................................................ 73/3
[58] Field of Search ...................... 73/1 B, 1 C, 3, 4 R, 73/4 V, 861.22, 861.24; 310/318

[56] References Cited

U.S. PATENT DOCUMENTS

| | | | |
|---|---|---|---|
| 4,022,061 | 5/1977 | Schendel | 73/3 |
| 4,776,222 | 10/1988 | Lew | 73/861.24 |
| 4,807,481 | 2/1989 | Lew | 73/861.24 |
| 4,910,994 | 3/1990 | Lew | 73/3 |

FOREIGN PATENT DOCUMENTS

| | | | |
|---|---|---|---|
| 0023820 | 2/1982 | Japan | 73/3 |
| 1103102 | 7/1984 | U.S.S.R. | 73/1 B |

*Primary Examiner*—Robert Raevis

[57] ABSTRACT

An impulse sensor comprises a pair of planar Piezo electric elements respectively disposed on two opposite sides of a reference plane within a cavity of the container vessel on a plane adjacent to a deflective wall of the cavity, which deflective wall has a force receiving member extending therefrom in a direction parallel to the reference plane, wherein each side of the combination of the pair of planar Piezo electric elements includes a middle electrode straddling the reference plane and in common contact with the two planar Piezo electric elements, and two side electrodes respectively disposed on two opposite sides of the reference plane and respectively in contact with the pair of planar Piezo electric elements, an electronic circuit combining two electrical signals respectively supplied from two side electrodes respectively disposed on two opposite sides of the reference plane in such a way that noises are cancelled therebetween and resultant electrical signal representing impulses experienced by the force receiving member is provided; and an electromotive force supply applying an input electric pulse of known amplitude across the two middle electrodes, that generates an output electric pulse from at least one of the side electrodes, wherein the ratio of the known amplitude of input electric pulse to the amplitude of output electric pulse is used as a calibration standard in determining the magnitude of the force experienced by the force receiving member from the amplitude of the resultant electrical signal.

11 Claims, 2 Drawing Sheets

IMPULSE SENSOR WITH AMPLITUDE CALIBRATION MEANS

BACKGROUND OF THE INVENTION

This is a continuation-in-part application to patent application Ser. No. 296,662 entitled "Impulse sensor with Calibration Means" filed on Jan. 13, 1989, now U.S. Pat. No. 4,910,994.

While the flowmeters of the present day technology measure only one of three flow variables which are the mass flow rate, volume flow rate and density of media, the flowmeters of the future technology will simultaneously measure all of the three flow variables. One of the most promising technologies which will bring forth the new flowmeter technology simultaneously measuring the three flow variables is the vortex shedding principles, which are employed in the construction of the present day vortex shedding flowmeters that measure only the volume flow rate by measuring the vortex shedding frequency. It has been observed that, while the frequency of vortex shedding from a bluff cylindrical body disposed across a fluid stream is proportional to the velocity of the fluid, the amplitude of the fluid dynamic force resulting from the vortex shedding is proportional to the dynamic pressure of fluid flow that is equal to one half of the fluid density times the square of fluid velocity. Once the fluid velocity is determined by measuring the vortex shedding frequency, and the dynamic pressure is determined by measuring the amplitude of the fluid dynamic force resulting from the vortex shedding, the mass flow rate can be determined as the ratio of the dynamic pressure to one half of the volume flow rate, and the fluid density can be determined as the ratio of the mass flow rate to the volume flow rate. Since the vortex shedding from a bluff body is a naturally occuring digital phenomenon, there is no uncertainity or potential error in determining the fluid velocity or the volume flow rate from the vortex shedding frequency by using an empirically determined relationship therebetween. On the other hand, the determination of the dynamic pressure of fluid flow from the amplitude of the fluid dynamic force resulting from the vortex shedding includes a number of different potential sources of error inherent to the analog nature of the method measuring the magnitude of the fluid dynamic force. The most immediate and obvious potential source of error arises from the conversion of the amplitude of an electrical signal representing the fluid dynamic force to the amplitude of the fluid dynamic force. In order to determine the dynamic pressure of fluid flow accurately, the calibration relationship converting the amplitude of the electrical signal to the amplitude of the fluid dynamic force must be determined accurately by an empirical method and the accuracy thereof has to be continuously checked and maintained. The present invention teaches how to construct a transducer converting the fluid dynamic force resulting from the vortex shedding to an alternating electrical signal, that has a built-in system checking and up-dating the accuracy of the conversion relationship between the amplitude of the fluid dynamic force and the amplitude of the electrical signal.

BRIEF SUMMARY OF THE INVENTION

The primary object of the present invention is to provide an impulse sensor, particularly a vortex sensor, that includes a pair of Piezo electric elements respectively disposed on two opposite sides of a reference plane and pressed against a deflective wall of the transducer container including a force receiving member extending from the deflective wall, wherein the pair of Piezo electric elements are polarized in two opposite directions and each side of the combination of the pair of Piezo electric elements has a middle electrodes straddling the reference plane and commonly in contact with the two Piezo electric elements, and two side electrodes respectively in contact with the two Piezo electric elements.

Another object is to provide an impulse sensor of the construction described by the aforementioned primary object of the present invention, wherein the two side electrodes located on one side of the combination of the two Piezo electric elements respectively supply two electrical signals which are combined in such a way that noises are cancelled therebetween and a resultant electrical signal representing the vortex shedding is obtained, while an input test electric pulse of known amplitude intermittently applied across the two middle electrodes respectively disposed on the two opposite sides of the combination of the two Piezo electric elements generates an output test electric pulse from the two side electrodes; wherein the ratio of the amplitude of the input test electric pulse to the amplitude of the output test electric pulse is used as a basis of calibration in determining the amplitude of the force laterally exerted on the force receiving member from the amplitude of the electrical signal supplied by the two side electrodes.

A further object is to provide an impulse sensor of the construction described by the aforementioned primary object of the present invention, wherein two side electrodes respectively disposed on the two opposite sides of the reference plane and on the two opposite sides of the combination of the two Piezo electric elements respectively supply two electrical signals which are combined in such a way that noises are cancelled therebetween and a resultant electrical signal representing the vortex shedding is obtained, while an input test electric pulse of known amplitude intermittently applied across the two middle electrodes respectively disposed on the two opposite sides of the combination of the two Piezo electric elements generates an output test electric pulse across the two side electrodes; wherein the ratio of the amplitude of the input test electric pulse to the amplitude of the output test electric pulse is used as a basis of calibration in determining the amplitude of the force laterally exerted on the force receiving member from the amplitude of the electrical signal supplied by the two side electrodes.

These and other objects of the present invention will become clear as the description thereof progresses.

BRIEF DESCRIPTION OF THE FIGURES

The present invention may be described with a greater clarity and specificity by referring to the following figures.

DESCRIPTION OF THE ILLUSTRATED EMBODIMENTS

Figure 1:
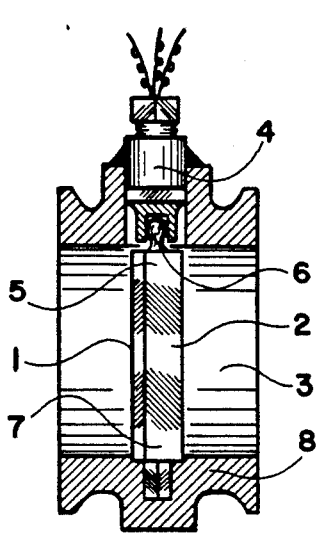
FIG. 1 illustrates a cross section of an embodiment of the vortex flowmeter employing the impulse sensor of the present invention.

In FIG. 1 there is illustrated a cross section of an embodiment of the vortex flowmeter employing the impulse sensor of the present invention. A vortex generating bluff body 2 disposed across a flow passage 3 is connected to a transducer package 4 anchored to the flowmeter body. One extremity 5 of the bluff body 2 is connected to the transducer package 4 by a mechanical coupling 6 providing a degree of flexibility therebetween for a minute flexural deflection thereat, while the other extremity of the bluff body 2 is secured to the flowmeter body 8. It should be mentioned that the mechanical coupling 6 can be eliminated by constructing the bluff body 2 as an extension of the transducer package 4, wherein the extremity 7 of the bluff body 2 may be secured to the flowmeter body 8 in a flexible arrangement employing a ball and socket joint. The transducer included in the transducer package 4 converts the fluid dynamic force generated as a reaction to the vortex shedding from the bluff body 1 and experienced thereby to an alternating electrical signal with frequency proportional to the velocity of fluid moving through the flow passage 3 and amplitude proportional to the dynamic pressure of the fluid flow. The volume flow rate of the fluid is determined from the frequency of the alternating electrical signal generated by the transducer, while the dynamic pressure of the fluid flow is determined from the amplitude of the electrical signal generated by the transducer. Since the mass flow rate is equal to the ratio of the dynamic pressure to one half of the volume flow rate, the mass flow rate can be determined from a combination of the frequency and amplitude of the alternating electrical signal generated by the transducer based on an empirically obtained relationship. The density of the fluid is determined as the ratio of the mass flow rate to the volume flow rate.

Figure 2:
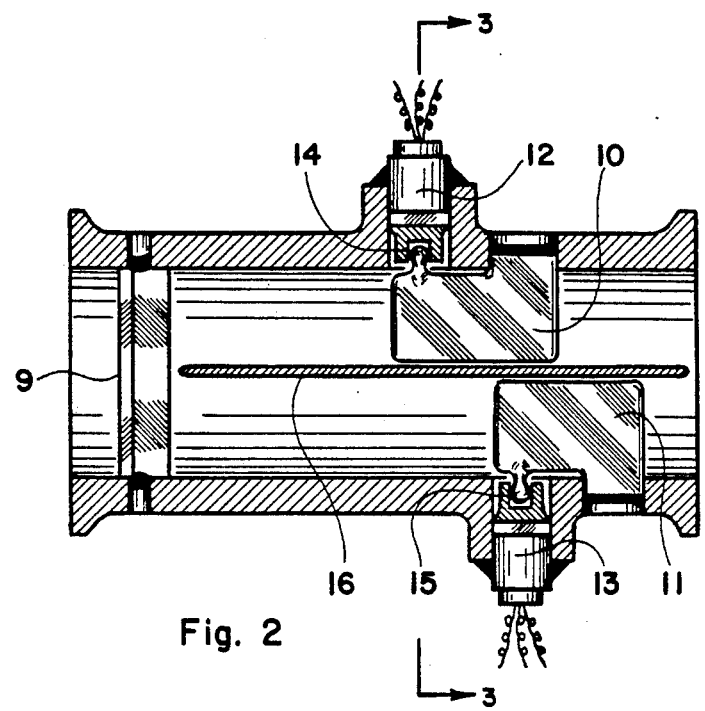
FIG. 2 illustrates a cross section of another embodiment of the vortex flowmeter employing the impulse sensor of the present invention.

In FIG. 2 there is illustrated a cross section of another embodiment of the vortex flowmeter comprising a vortex generating bluff body 9 disposed across a flow passage and a pair of vortex sensing planar members 10 and 11 disposed downstream of the bluff body 9 respectively in two parallel flow passages divided from one another by a divider plate 16, which two vortex sensing planar members 10 and 11 are respectively connected to two transducer packages 12 and 13 by means of mechanical couplings 14 and 15, which may be a ball and socket type joint or other mechanical coupling such as a threaded, plug or welded joint. The distance between the leading edges of the two vortex sensing planar members 10 and 11 should be equal to one half of the wave length of sinuating streamlines created by vortices shed from the bluff body 9, or equal to one half plus integer times the wave length of the sinuating streamlines. The two electrical signals respectively generated by the two transducers 12 and 13 are combined by an electrical circuit similar to that shown in FIG. 8 or 9 to cancel noises generated by the structural vibration of the flowmeter therebetween and obtain a resultant electrical signal representing the fluid dynamic force generated by the vortex shedding from the bluff body 9 and experienced by the vortex shedding planar members 10 and 11. Of course, in an alternative design, one of the two vortex sensing members 10 and 11 and the divider plate 16 can be eliminated, wherein the single vortex sensing planar member may extend all the way across the flow passage and be secured to the flowmeter body at the extremity diametrically opposite to the transducer package. The embodiment of the vortex flowmeter shown in FIG. 2 operates on the same principles as those described in conjunction with FIG. 1 in measuring the volume and mass flow rates of the fluid as well as the density of the fluid.

Figure 3:
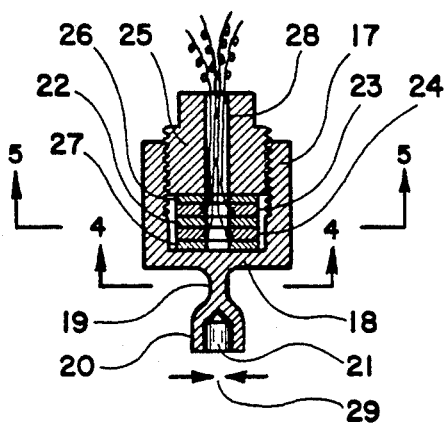
FIG. 3 illustrates a cross section of an embodiment of the impulse sensor of the present invention.

In FIG. 3 there is illustrated a cross section of the transducer package included in the embodiment shown in FIG. 1 or 2, which cross section is taken along plane 3—3 as shown in FIG. 2. The transducer package comprises a cylindrical container 17 including a cavity with a deflective end wall 18 with a reinforcing rib 19, from which a force receiving member 20 with a mechanical coupling means 21 such as a socket, plug or threaded joint means extends. The cavity included in the cylindrical container 17 contains a combination 22 of two Piezo electric elements sandwiched between two electrode discs 23 and 24, which combination disposed between two insulator discs 26 and 27 is pressed against the deflective end wall 18 by a plug 25 threadedly engaging the open end of the cavity included in the cylindrical container 17. The lead wires extending from the electrodes included in the Piezo electric transducers contained in the cylindrical container 17 are routed through a hole 28 coaxially disposed through the plug 25, which hole may be sealed with glass or ceramic filler. The impulse or force 29 acting perpendicular to a reference plane including the reinforcing rib 19 and transmitted to the force receiving member 20 alternatively compresses and decompresses two Piezo electric elements included in the combination 22, which are respectively disposed on the two opposite sides of the reference plane including the reinforcing rib and, consequently, generates electrical signals which are transmitted by the lead wires.

Figure 4:
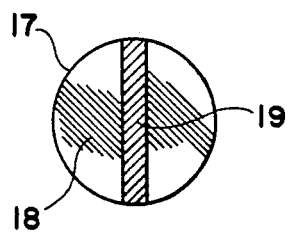
FIG. 4 illustrates another cross section of the embodiment shown in FIG. 3.

In FIG. 4 there is illustrated another cross section of the transducer package shown in FIG. 3, which cross section is taken along plane 4—4 as shown in FIG. 3. The reinforcing rib 19 built on and reinforcing the end wall 18 against the pressure exerted internally by the threaded plug 25 or externally by the pressure of the fluid contained in the flow passage extends diametrically across the end wall 18 of the cylindrical container 17. The reference plane including the reinforcing rib 19 is generally parallel to the central axis of the flow passage.

Figure 5:
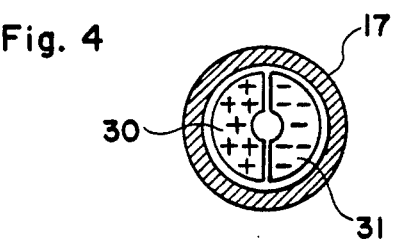
FIG. 5 illustrates two Piezo electric elements included in the embodiment shown in FIG. 3.

In FIG. 5 there is illustrated a further cross section of the transducer package shown in FIG. 3, which cross section taken along plane 5—5 as shown in FIG. 3 shows two semicircular Piezo electric elements 30 and 31 disposed on two opposite sides of the reference plane including the reinforcing rib 19, wherein the two Piezo electric elements 30 and 31 constituting the combination 22 shown in FIG. 3 have opposite polarities.

Figure 6:
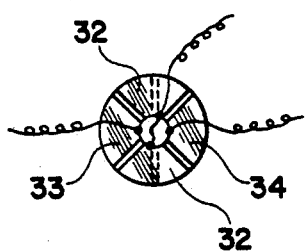
FIG. 6 illustrates an arrangement of electrodes in conjunction with the combination of the two Piezo electric elements shown in FIG. 5.

In FIG. 6 there is illustrated a plan view of an embodiment of the electrode disc 23 or 24 shown in FIG. 3, which includes a middle electrode 32 straddling the reference plane and in common contact with the two semicircular Piezo electric elements 30 and 31, and two side electrodes 33 and 34 respectively in contact with the two semicircular Piezo electric elements 30 and 31, wherein each of the electrodes has a lead wire extending therefrom and routed through the hole 28 included in the plug 25 as shown in FIG. 3.

Figure 7:
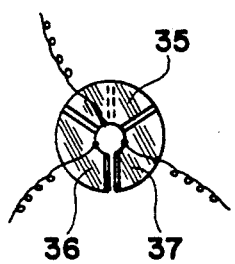
FIG. 7 illustrates another arrangement of electrodes in conjunction with the combination of the two Piezo electric elements shown in FIG. 5.

In FIG. 7 there is illustrated plan view of another embodiment of the electrode disc including a middle electrode 35 in common contact with the two semicircular Piezo electric elements and two side electrodes 36 and 37 respectively in contact with the two semicircular Piezo electric elements, which electrode disc can be employed in place of that shown in FIG. 6 in constructing the transducer package shown in FIG. 3.

Figure 8:
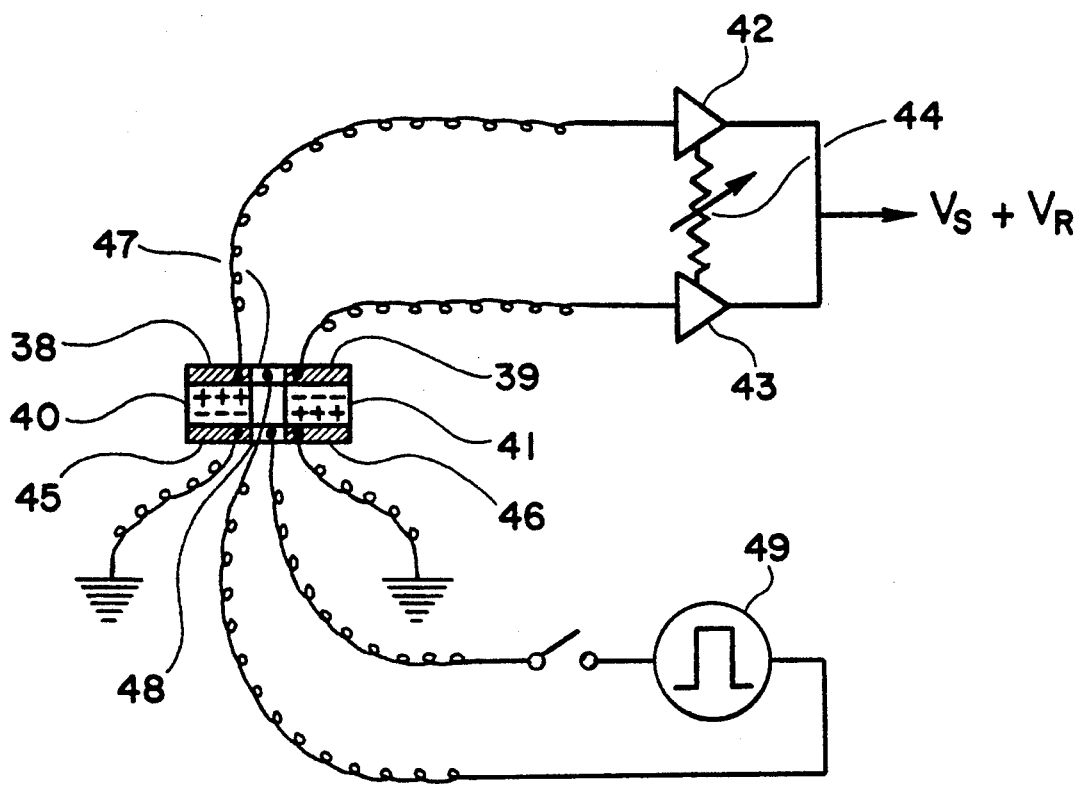
FIG. 8 illustrates an embodiment of the electrical circuit connected to the combination of the two Piezo electric elements shown in FIG. 5 and the electrodes thereof.

In FIG. 8 there is illustrated an embodiment of the electric circuit usable in conjunction with the transducer package shown in FIG. 3. The two side electrodes 38 and 39 disposed on one side of the combination of the two oppositely polarized semicircular Piezo electric elements 40 and 41 and respectively disposed on the two opposite sides of the reference plane are respectively connected to two amplifiers 42 and 43 including signal balancing means 44 therebetween, which signal balancing means may comprise at least one variable resistor or variable gain controller. The pair of amplifiers 42 and 43 can be a pair of noninverting amplifiers or inverting amplifiers. The two side electrodes 45 and 46 disposed on the other side of the combination of the two Piezo electrical elements 40 and 41 may be grounded. The two middle electrodes 47 and 48 are respectively connected to two opposite terminals of a source 49 of electromotive force, that includes a switching means for applying a test electric pulse of known amplitude across the two middle electrodes 47 and 48. The lateral force or impulse generally perpendicular to the reference plane such as the fluid dynamic force generated by the vortex shedding and experienced by the force receiving member 20 shown in FIG. 3 alternatively compresses and decompresses the two Piezo electric elements 40 and 41, which action generates electromotive forces of the same sign from the two side electrodes 38 and 39. The force or impulse perpendicular to the plane including the two Piezo electric elements 40 and 41 created by the mechanical vibration of the flowmeter body generates electromotive forces of opposite signs from the two side electrodes 38 and 39. The signal balancing means 44 is set to cancel the two noise signals having opposite signs and respectively supplied by the two side electrodes 38 and 39 between the two amplifiers 42 and 43, whereby the resultant signal $V_S$ resulting from the addition of the outputs from the two amplifiers 42 and 43 represents only the lateral force perpendicular to the reference plane representing the fluid dynamic force created by the vortices. The electromotive force source 49 intermittently applies an input test electric pulse of known amplitude across the two middle electrodes 47 and 48, which generates an output test electric pulse $V_R$ from the combination of the amplifiers 42 and 43. The amplitude of the lateral force or impulse experienced by the force receiving member 20 shown in FIG. 3 is proportional to the amplitude of the electrical signal $V_S$ generated by the lateral force or impulse times the ratio of the amplitude of the input test electric pulse to the amplitude of the output test electric pulse, which relationship defining the conversion relationship that converts the amplitude of the electrical signal $V_S$ to the amplitude of the fluid dynamic force generated by the vortices, is continuously or intermittently updated by the ratio of amplitudes of the test electric pulses obtained and substituted thereinto on a real time basis. As a consequence, the error resulting from changes in the electromechanical characteristics of the Piezo electric elements included in the transducer package caused by the aging, fatigue and temperature change is eliminated in determining the dynamic pressure of fluid flow from the amplitude of the alternating electrical signal representing the vortex shedding.

Figure 9:
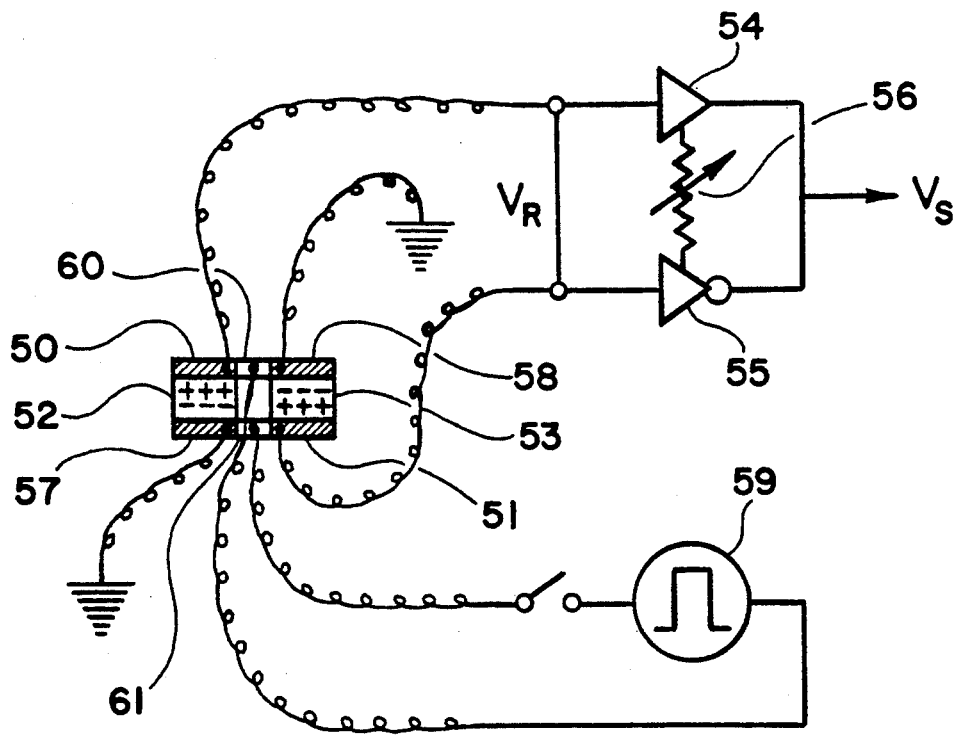
FIG. 9 illustrates another embodiment of the electrical circuit connected to the combination of the two Piezo electric elements shown in FIG. 5 and the electrodes thereof.

In FIG. 9 there is illustrated another embodiment of the electric circuit usable in conjunction with the transducer package shown in FIG. 3. The two side electrodes 50 and 51 respectively disposed on two opposite sides of the combination of two oppositely polarized Piezo electric elements 52 and 53 and respectively disposed on two opposite sides of the reference plane are respectively connected to a noninverting amplifier 54 and an inverting amplifier 55, which combination of the amplifiers 54 and 55 has a signal balancing means 56 therebetween. The other side electrodes 57 and 58 may be grounded. A source 59 of electromotive force with a switching means intermittently applies an input test electric pulse of known amplitude across the two middle electrodes 60 and 61, that generates an output test electric pulse of amplitude $V_R$ across the two side electrodes 50 and 51. The resultant electric signal $V_S$ represents the fluid dynamic force created by the vortices as the mechanical noises are cancelled between the two amplifiers 54 and 55. The ratio of the known amplitude of the input test electric pulse to the amplitude $V_R$ of the output test electric pulse is used as a calibration standard in converting the amplitude of the resultant electrical signal $V_S$ to the amplitude of the fluid dynamic force created by the vortices as described in conjunction with FIG. 8.

It should be mentioned that the two semicircular Piezo electric elements included in the transducer package shown in FIG. 3 may be disposed in such a way that the polarizations thereof point the same direction. In such an alternative arrangement, the pair of amplifiers 42 and 43 employed in the embodiment shown in FIG. 8 must be replaced by a combination of a noninverting and inverting amplifiers as exemplified by the combination shown in FIG. 9, while the combination of a noninverting and an inverting amplifiers 54 and 55 employed in the embodiment shown in FIG. 9 have to be replaced by a pair of noninverting or inverting amplifiers as exemplified by the combination shown in FIG. 8.

While the principles of the present inventions have now been made clear by the illustrative embodiments there will be many modifications of the structures, arrangements, proportions, elements and materials obvious to those skilled in the art, which are particularly adapted to the specific working environments and operating conditions in the practice of the inventions without departing from those principles. It is not desired to limit the inventions to the particular illustrative embodiments shown and described and, accordingly, all suitable modifications and equivalents may be regarded as falling within the scope of the inventions as defined by the claims which follow.

The embodiments of the invention, in which an exclusive property or priviledge is claimed, are defined as follows:

1. An apparatus for detecting impulse comprising in combination:
   a) a container vessel including a cavity with a deflective wall on one side and a force receiving member extending from said deflective wall;
   b) a pair of planar Piezo electric elements disposed within said cavity on a plane adjacent and generally parallel to said deflective wall respectively on two opposite sides of a reference plane generally perpendicular to the deflective wall and pressed against the deflective wall, wherein each side of the combination of said pair of planar Piezo electric elements includes a middle electrode straddling the reference plane and in common contact with the pair of planar Piezo electric elements, and two side electrodes respectively disposed on two opposite sides of the reference plane and respectively in contact with the pair of planar Piezo electric elements;
   c) electronic circuit means for combining a first electrical signal from one side electrode disposed on one side of the reference plane and a second electrical signal from another side electrode disposed on the other side of the reference plane opposite to said one side, wherein electrical signal generated by a mechanical impulse perpendicular to the deflective wall is cancelled between said first and second electrical signals and electrical signal generated by a mechanical impulse perpendicular to the reference plane and experienced by the force receiving member is obtained;
   d) means for imposing a pulsed input electrical potential difference of known amplitude across the two middle electrodes respectively disposed on two opposite sides of the combination of said first and second planar Piezo electric elements; and
   e) means for determining ratio of amplitude of pulsed output electrical potential generated by said pulsed input electrical potential difference and supplied from at least one of said one and another side electrodes to the known amplitude of said pulsed input electrical potential difference as a calibration standard in determining amplitude of the mechanical impulse experienced by the force receiving member from amplitude of output electrical signal from said electronic circuit means.

2. The combination as set forth in claim 1 wherein the side electrodes other than said one and another side electrodes are grounded.

3. The combination as set forth in claim 1 wherein said deflective wall of the container vessel includes a reinforcing rib disposed diametrically thereacross on the reference plane.

4. The combination as set forth in claim 1 wherein said one and another side electrodes are disposed on one side of the combination of said pair of planar Piezo electric elements.

5. The combination as set forth in claim 4 wherein ratio of amplitude of pulsed output electrical potentials from a combination of said one and another side electrodes generated by said pulsed input electrical potential difference to amplitude of said pulsed input electrical potential difference is used as said calibration standard.

6. The combination as set forth in claim 5 wherein the side electrodes other than said one and another side electrodes are grounded.

7. The combination as set forth in claim 5 wherein said deflective wall of the container vessel includes a reinforcing rib disposed diametrically thereacross on the reference plane.

8. The combination as set forth in claim 1 wherein said one and another side electrodes are respectively disposed on two opposite sides of the combination of said pair of planar Piezo electric elements.

9. The combination as set forth in claim 8 wherein ratio of amplitude of output potential difference between said one and another side electrodes generated by said pulsed input potential difference to amplitude of said pulsed input potential difference is used as said calibration standard.

10. The combination as set forth in claim 9 wherein the side electrodes other than said one and another side electrodes are grounded.

11. The combination as set forth in claim 9 wherein said deflective wall of the container vessel includes a reinforcing rib disposed diametrically thereacross on the reference plane.